(12) United States Patent
Sun et al.

(10) Patent No.: US 11,402,268 B2
(45) Date of Patent: Aug. 2, 2022

(54) METHOD AND SYSTEM FOR DETERMINING INTERNAL QUALITY ATTRIBUTE(S) OF ARTICLES OF AGRICULTURAL PRODUCE

(71) Applicant: The New Zealand Institute for Plant and Food Research Limited, Auckland (NZ)

(72) Inventors: Zhe Sun, Hamilton (NZ); Nathaniel Kenneth Tomer, Hamilton (NZ); Vincent Andrew McGlone, Hamilton (NZ); Rainer Künnemeyer, Hamilton (NZ)

(73) Assignee: The New Zealand Institute for Plant and Food Research Limited, Auckland (NZ)

( * ) Notice: Subject to any disclaimer, the term of this patent is extended or adjusted under 35 U.S.C. 154(b) by 30 days.

(21) Appl. No.: 16/620,345

(22) PCT Filed: Jun. 11, 2018

(86) PCT No.: PCT/NZ2018/050079
§ 371 (c)(1),
(2) Date: Dec. 6, 2019

(87) PCT Pub. No.: WO2018/226105
PCT Pub. Date: Dec. 13, 2018

(65) Prior Publication Data
US 2020/0182696 A1    Jun. 11, 2020

(30) Foreign Application Priority Data
Jun. 9, 2017    (NZ) ........................................ 732719

(51) Int. Cl.
*G01J 3/28*        (2006.01)
*G01N 21/84*       (2006.01)
*G06V 10/143*      (2022.01)

(52) U.S. Cl.
CPC ............ *G01J 3/2823* (2013.01); *G01N 21/84* (2013.01); *G06V 10/143* (2022.01); *G01N 2021/8466* (2013.01)

(58) Field of Classification Search
CPC .......... G01J 3/2823; G01N 2021/8466; G01N 21/3151; G01N 21/359; G01N 21/49; G01N 21/84; G01N 21/85; G06K 9/2018
(Continued)

(56) References Cited

U.S. PATENT DOCUMENTS

| | | | |
|---|---|---|---|
| 3,458,261 | A | 7/1969 | Bentley et al. |
| 5,077,477 | A | 12/1991 | Stroman et al. |

(Continued)

FOREIGN PATENT DOCUMENTS

| | | |
|---|---|---|
| CN | 105866050 A | 8/2016 |
| GB | 2498086 B | 3/2013 |

(Continued)

OTHER PUBLICATIONS

Fu et al., Application of NIR spectroscopy for firmness evaluation of peaches, Journal of Zhejiang University Science B, 2008, pp. 552-557, China.

(Continued)

*Primary Examiner* — Sunghee Y Gray
(74) *Attorney, Agent, or Firm* — Warner Norcross + Judd LLP

(57) ABSTRACT

An aspect of the invention provides a method for determining at least one internal quality attribute of an article (102) of agricultural produce. The method includes receiving a plurality of first spectroscopic values obtained from directing low band light in a first wavelength associated to a low band of wavelengths from at least one low band light source (104) at least partly through the article (102) toward at least one detector (120); receiving a plurality of second spectroscopic values obtained from directing high band light in a second wavelength associated to a high band of wavelengths from at least one high band light source (106) at least partly through the article (102) toward the at least one detector (Continued)

(120); determining at least one measured spatial profile associated to the article, the at least one measured spatial profile comprising at least one of a plurality of ratios of respective first spectroscopic values to respective second spectroscopic values, a plurality of ratios of respective second spectroscopic values to respective first spectroscopic values; and determining the at least one internal quality attribute at least partly from a comparison of the at least one measured spatial profile with at least one reference spatial profile associated to a class of articles of agricultural produce.

9 Claims, 13 Drawing Sheets

(58) Field of Classification Search
USPC ......................................................... 356/326
See application file for complete search history.

(56) References Cited

U.S. PATENT DOCUMENTS

| | | | |
|---|---|---|---|
| 7,316,322 | B2 | 1/2008 | Kawabata et al. |
| 7,746,452 | B2 | 6/2010 | Fuchigami et al. |
| 7,787,111 | B2 | 8/2010 | Kim et al. |
| 8,014,569 | B2 | 9/2011 | Durkin et al. |
| 8,885,872 | B2 | 11/2014 | Kim et al. |

FOREIGN PATENT DOCUMENTS

| | | | | |
|---|---|---|---|---|
| JP | H08122250 A | | 5/1996 | |
| WO | WO-2017117320 A1 | * | 7/2017 | ............. G01N 21/31 |

OTHER PUBLICATIONS

Kemsley et al., Feasibility study of NIR diffuse optical tomography on agricultural produce, Postharvest Biology and Technology, 2008, pp. 223-230, UK.

Kuroki et al., Positioning in spectral measurement dominates estimation performance of internal rot in onion bulbs, Postharvest Biology and Technology, 2017, pp. 18-23, Japan.

Wang et al., Measurement of the light absorption and scattering properties of onion skin and flesh at 633 nm, Postharvest Biology and Technology, 2013, pp. 494-501, Athens, Georgia, United States.

Wang et al., Optical Properties of Healthy and Diseased Onion Tissues in the Visible and Near-Infrared Spectral Region, American Society of Agricultural and Biological Engineers, 2014, pp. 1771-1782, vol. 57(6).

International Search Report and Written Opinion from PCT/NZ2018/050079 dated Sep. 6, 2018.

* cited by examiner

METHOD AND SYSTEM FOR DETERMINING INTERNAL QUALITY ATTRIBUTE(S) OF ARTICLES OF AGRICULTURAL PRODUCE

FIELD OF THE INVENTION

The invention relates to a method and system for determining internal quality attribute(s) of articles of agricultural produce. The invention is particularly suitable for use in detecting internal quality attributes such as internal defects in articles of agricultural produce such as apples and onions. Examples include the presence of vascular browning in apples and the presence of *botrytis* fungus and/or *pseudomonas* bacteria in onions.

BACKGROUND OF THE INVENTION

Near infrared (NIR) spectroscopy is known to be used for commercial grading of internal quality attributes of fruits such as taste and the presence of rots. However, detection of small and/or localised internal defects is often very difficult.

United Kingdom patent GB 2,498,086 to MAF Agrobotic (MAF) discloses a device and method for non-destructive defects in fruits and vegetables. The method uses two sources of electromagnetic radiation, one emitting in a low band and the other in a high band. The mean wavelength of the high band and the mean wavelength of the low band are separated, for example, by at least 80 nanometres (nm).

A control device is adapted so as to be able to switch on one then the other of the two sources of electromagnetic radiation in alternation. The two sources of radiation are never switched on simultaneously. The beams are substantially identical in direction and in shape and would coincide if they were switched on simultaneously.

MAF discloses calculation of a simple index of defectiveness. One example of an index is a ratio of the powers transmitted in the low band and high band. The index of defectiveness of an object is compared with at least one predetermined value, so as to be able to sort the object according to its index of defectiveness.

Upchurch, B. L., Throop, J. A., Aneshansley, D. J., 1997. Detecting internal breakdown in apples using interactance measurements, Postharvest Biology and Technology 10, 15-19 (Upchurch) discloses using interactance measurements to detect internal breakdown in apples. An apple is placed on a light box so that light enters the calyx or lower end. A fibre optic probe is placed in contact with a cheek of the apple midway between the stem (upper) end and the calyx end. Only one site was selected for each apple.

Upchurch notes that transmittance is a non-destructive technique for identifying apples with internal breakdown. The technique is however said to be difficult to implement into an on-line inspection system.

In the case of apples, an internal defect known as vascular browning is very difficult to detect from a single ratio of two signals. Vascular browning is characterised by small open cavities near an apple core. The core itself is an open cavity. Vascular browning cavities discolour only mildly, turning light brown with oxidation. The combination of small size, proximity to the core, and a lack of strong absorbance changes makes detection challenging.

Clark, C. J., McGlone, V. A., Jordan, R. B., 2003. Detection of Brownheart in 'Braeburn' apple by transmission NIR spectroscopy, Postharvest Biology and Technology 28, 87-96 (Clark) discloses techniques for the detection of an internal browning disorder in apples. Clark discloses placing fruit centrally on a fruit holder by hand. Four different orientations of light source, fruit orientation and transmission detector were investigated. Orientation of the fruit with respect to a lamp and detector geometry was found to have a pronounced effect on the amount of light transmitted by the fruit.

Clark notes that sample averaging from up to four different locations around an apple could lead to improved precision. However, at grading speeds this may be impractical. Multiple measurements are said to be acceptable for manual experiments with limited numbers of fruit where careful control of the light source, fruit orientation and detector geometry can be maintained for successive readings at different sites.

In the case of onions, traditional NIR technology suffers a high false positive rate. The misclassification of good onions as defective is estimated to be as high as 40% in some cases. This problem represents a significant barrier to the effective use of NIR technology for defect sorting in the onion industry.

It is an object of at least preferred embodiments of the present invention to address some of the aforementioned disadvantages. An additional or alternative object is to at least provide the public with a useful choice.

SUMMARY OF THE INVENTION

In accordance with an aspect of the invention, a method for determining at least one internal quality attribute of an article of agricultural produce comprises receiving a plurality of first spectroscopic values obtained from directing low band light in a first wavelength associated to a low band of wavelengths from at least one low band light source at least partly through the article toward at least one detector; receiving a plurality of second spectroscopic values obtained from directing high band light in a second wavelength associated to a high band of wavelengths from at least one high band light source at least partly through the article toward the at least one detector; determining at least one measured spatial profile associated to the article, the at least one measured spatial profile comprising a plurality of ratios of respective first spectroscopic values to respective second spectroscopic values and/or a plurality of ratios of respective second spectroscopic values to respective first spectroscopic values; and determining the at least one internal quality attribute at least partly from a comparison of the at least one measured spatial profile with at least one reference spatial profile associated to a class of articles of agricultural produce.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment the article has an axis between a first pole and a second pole, a plurality of latitudes along the axis, and a plurality of longitudes around a circumference of the article; the first spectroscopic values are associated to respective longitudes representing respective longitudes of the article to which low band light is directed from the at least one low band light source; and the second spectroscopic values are associated to respective longitudes representing respective longitudes of the article to which high band light is directed from the at least one high band light source.

In an embodiment the at least one measured spatial profile includes a first measured spatial profile, the first measured spatial profile including at least a first ratio and a second ratio, the longitude associated to the first ratio not equal to the longitude associated to the second ratio.

In an embodiment the at least one measured spatial profile includes a plurality of at least 3 ratios each associated to different longitudes.

In an embodiment the first spectroscopic values are associated to respective latitudes representing respective latitudes along the axis of the article to which low band light is directed from the at least one low band light source; and the second spectroscopic values are associated to respective latitudes representing respective latitudes of the article to which high band light is directed from the at least one high band light source.

In an embodiment a latitude associated to the first ratio is equal to a latitude associated to the second ratio.

In an embodiment the at least one measured spatial profile includes a second measured spatial profile, the second measured spatial profile including at least a first ratio and a second ratio each associated to the same latitude not equal to the latitude associated to the first ratio and the second ratio of the first measured spatial profile.

In an embodiment the at least one measured spatial profile includes a plurality of at least 3 measured spatial profiles, the measured profiles each associated to different latitudes.

In an embodiment the method further comprises determining the at least one internal quality attribute at least partly from a comparison of a signature value associated to the at least one measured spatial profile with a reference value associated to the at least one reference spatial profile.

In an embodiment the signature value is determined from a subset of the ratios of the at least one measured spatial profile.

In an embodiment the at least one low band light source and the at least one high band light source are configured to direct light at least partly through the article simultaneously.

In an embodiment an extractor is configured to extract, from the light transmitted through the article, at least one of the light transmitted from the at least one low band light source and the light transmitted from the at least one high band light source.

In an embodiment the article is at least partly spherical.

In an embodiment the lengths of at least some of the wavelengths associated to the first band of wavelengths are less than the lengths of at least some of the wavelengths associated to the second band of wavelengths.

In an embodiment the lengths of at least some of the wavelengths associated to the first band of wavelengths is in the range 699 nm to 900 nm.

In an embodiment the first wavelength is of length 728 nm.

In an embodiment the lengths of at least some of the wavelengths associated to the second band of wavelengths is in the range 729 nm to 900 nm.

In an embodiment the second wavelength is of length 805 nm.

In accordance with a further aspect of the invention, an assessment system is configured to determine at least one internal quality attribute of an article of agricultural produce. The system comprises a comparator configured to: receive a plurality of first spectroscopic values obtained from directing low band light in a first wavelength associated to a low band of wavelengths from at least one low band light source at least partly through the article toward at least one detector, receive a plurality of second spectroscopic values obtained from directing high band in a second wavelength associated to a high band of wavelengths from at least one high band light source at least partly through the article toward the at least one detector, determine at least one measured spatial profile associated to the article, the at least one measured spatial profile comprising a plurality of ratios of respective first spectroscopic values to respective second spectroscopic values and/or a plurality of ratios of respective second spectroscopic values to respective first spectroscopic values, and determine the at least one internal quality attribute at least partly from a comparison of the at least one measured spatial profile with at least one reference spatial profile associated to a class of articles of agricultural produce; and an output module configured to output the at least one internal quality attribute.

In accordance with a further aspect of the invention, a computer readable medium has stored thereon processor executable instructions that, when executed by a processor, cause the processor to perform a method for determining at least one internal quality attribute of an article of agricultural produce. The method comprises receiving a plurality of first spectroscopic values obtained from directing low band light in a first wavelength associated to a low band of wavelengths from at least one low band light source at least partly through the article toward at least one detector; receiving a plurality of second spectroscopic values obtained from directing high band light in a second wavelength associated to a high band of wavelengths from at least one high band light source at least partly through the article toward the at least one detector; determining at least one measured spatial profile associated to the article, the at least one measured spatial profile comprising a plurality of ratios of respective first spectroscopic values to respective second spectroscopic values and/or a plurality of ratios of respective second spectroscopic values to respective first spectroscopic values; and determining the at least one internal quality attribute at least partly from a comparison of the at least one measured spatial profile with at least one reference spatial profile associated to a class of articles of agricultural produce.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

In addition, where features or aspects of the invention are described in terms of Markush groups, those persons skilled in the art will appreciate that the invention is also thereby described in terms of any individual member or subgroup of members of the Markush group.

As used herein, '(s)' following a noun means the plural and/or singular forms of the noun.

As used herein, the term 'and/or' means 'and' or 'or' or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

The terms 'component', 'module', 'system', 'interface', and/or the like as used in this specification in relation to a processor are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The term 'computer-readable medium' should be taken to include a single medium or multiple media. Examples of multiple media include a centralised or distributed database and/or associated caches. These multiple media store the one or more sets of computer executable instructions. The term 'computer readable medium' should also be taken to include any medium that is capable of storing, encoding or carrying a set of instructions for execution by a processor and that cause the processor to perform any one or more of the methods described above. The computer-readable medium is also capable of storing, encoding or carrying data structures used by or associated with these sets of instructions. The term 'computer-readable medium' includes solid-state memories, optical media and magnetic media.

The term 'connected to' as used in this specification in relation to data or signal transfer includes all direct or indirect types of communication, including wired and wireless, via a cellular network, via a data bus, or any other computer structure. It is envisaged that they may be intervening elements between the connected integers. Variants such as 'in communication with', 'joined to', and 'attached to' are to be interpreted in a similar manner. Related terms such as 'connecting' and 'in connection with' are to be interpreted in the same manner.

In the description in this specification reference may be made to subject matter which is not within the scope of the appended claims. That subject matter should be readily identifiable by a person skilled in the art and may assist in putting into practice the invention as defined in the presently appended claims.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

Preferred forms of the method for determining at least one internal quality attribute of an article of agricultural produce will now be described by way of example only with reference to the accompanying figures in which.

DETAILED DESCRIPTION

Figure 1:
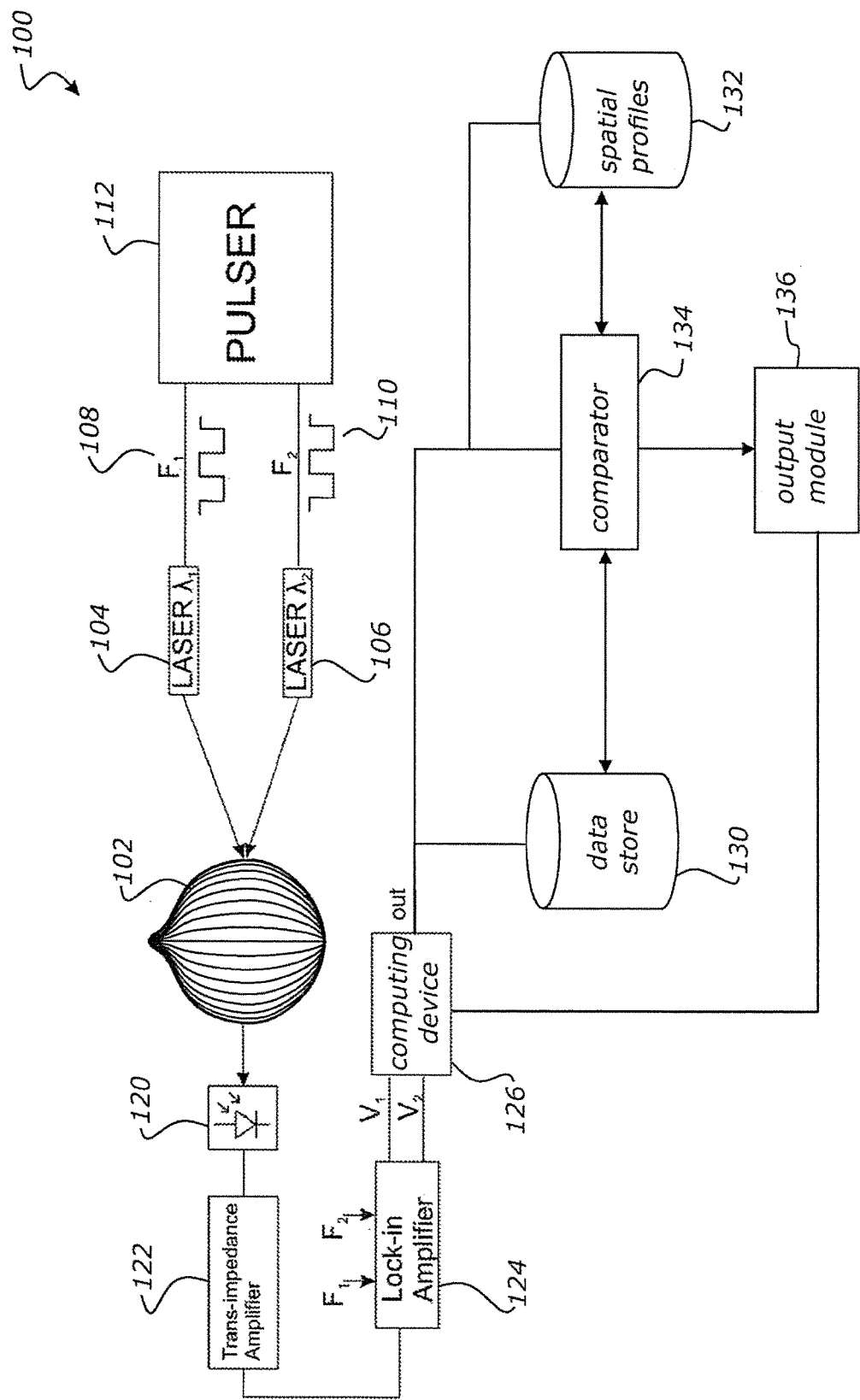
FIG. 1 shows a system for determining an internal quality attribute of an article.

FIG. 1 shows an example of a system 100 configured to determine at least one internal quality attribute of an article of agricultural produce 102. In an embodiment the article of agricultural produce comprises an onion. The system is configured to detect the presence of *botrytis* fungus and/or *pseudomonas* bacteria as an example of an internal quality attribute of the onion.

In an embodiment the system 100 is configured to detect the presence of vascular browning in at least one apple. The presence of vascular browning is an example of an internal quality attribute of the apple.

In an embodiment the article of agricultural produce is selected from a group of fruits and vegetables, for example onions, apples, potatoes, avocados, oranges, peaches, apricots, berries.

The system includes at least one laser diode positioned so as to direct a beam of light through the article 102. The system 100 shows two laser diodes indicated at 104 and 106 respectively. The lasers 104 and 106 are configured to provide intense light within a small illumination area on the article 102.

In an embodiment laser 104 is modulated with a square wave of frequency 108 and laser 106 is modulated with a square wave of frequency 110. A pulser 112 controls the operation of the lasers 104 and 106. In an embodiment the pulser 112 is configured to cause the lasers 104 and 106 to direct light at least partly through the article 102 simultaneously.

A detector 120 is positioned so as to measure the light transmitted through the article 102 from at least one of the lasers 104 and 106. In an embodiment the detector 120 comprises a photodiode for example a silicon photodiode. The detector 120 determines at least one spectroscopic value associated to respective lasers. In an embodiment the detector 120 collects the light from laser 104 and/or laser 106.

In an embodiment the lasers 104 and 106 operate at different wavelengths to each other. In an embodiment laser 104 for example is configured to operate at a first wavelength in the range 699 nm to 900 nm. In an embodiment laser 104 for example is configured to operate at a first wavelength in the range 700 nm to 750 nm. In an embodiment laser 104 for example is configured to operate at a first wavelength in the range 850 nm to 900 nm. In an embodiment laser 104 is configured to operate at a wavelength of length 730 nm. In an embodiment laser 104 is configured to operate at a wavelength of length 699 nm. In an embodiment laser 104 is configured to operate at a wavelength of length 728 nm.

In an embodiment laser 106 for example is configured to operate at a second wavelength in the range 729 nm to 900 nm. In an embodiment laser 106 for example is configured to operate at a second wavelength in the range 850 nm to 900 nm. In an embodiment laser 106 for example is configured to operate at a second wavelength in the range 780 nm to 810 nm. In an embodiment laser 106 is configured to operate at a wavelength the range 729.1 nm to 803.9 nm. In an embodiment laser 106 is configured to operate at a wavelength of length 800 nm. In an embodiment the laser 106 is configured to operate at a wavelength of length 805 nm.

In an embodiment the lasers 104 and 106 are mounted in respective laser diode mounts (not shown) driven by respective laser diode drivers and controllers (not shown).

In an embodiment two lenses (not shown) are used to focus the light from the respective lasers to a target area on the surface of the article 102. In an embodiment the target area has a 5 mm radius. In an embodiment an adjustable pinhole is used to remove the elliptical shape of the beam and any stray light.

In an embodiment the detector 120 is connected to an amplifier 122 to convert the current from the photodiode 112 to a voltage. In an embodiment the amplifier 122 comprises a trans-impedance amplifier. The amplifier 122 is connected to a lock-in amplifier 124. In an embodiment the amplifier 124 is a multi-channel digital lock-in amplifier.

The lock-in amplifier 124 is configured to extract, from the light transmitted through the article 102, the light signals from laser 104 and/or the light signals from laser 106 at least partly from the frequencies 108 generated by the pulser 112. In an embodiment the lock-in amplifier is configured to extract the signals concurrently using modulation frequency. The amplifier 124 outputs two different light signals associated to the light received from laser 104 and laser 106 respectively.

In an embodiment the lasers 104 and 106 are modulated with square waveform shown at 108 and 110 respectively. Square wave modulation allows for a simplified driver circuit, as it requires a digital switch rather than analogue current control. In an embodiment the modulation frequency is selected so as to achieve an optimal trans-impedance gain and simplify the electronics design. Example modulation frequencies for the lasers include 11, 13, 17, 19 kHz respectively.

In an embodiment the lock-in amplifier 124 demodulates each of the signals associated to the respective lasers according to their frequencies. In an embodiment a low pass filter (not shown) is applied to the output of the lock-in amplifier 124.

In an embodiment the detector 120 generates a plurality of absorption coefficient data values or spectroscopic values, referred to as absorption values. As the light from each of the lasers 104 and 106, 108 passes through the article 102, the light is subject to absorption. The detector 120 measures the extent of absorption by the article 102 of the light from the respective lasers.

A computing device 126 receives the light signals output by the lock-in amplifier 124. In an embodiment the computing device 126 receives a plurality of spectroscopic values obtained from directing low band light from laser 104 at least partly through the article 102 toward the detector 120. In an embodiment the computing device 126 also receives a plurality of spectroscopic values obtained from directing high band light from laser 106 at least partly through the article 102 toward the detector 120.

In an embodiment the computing device 126 is connected to the lock-in amplifier 124. In an embodiment the spectroscopic values obtained from the amplifier 124 and stored for example on a computer readable medium before being input to the computing device 126.

A data store 130, for example, maintains the absorption values obtained from the detector 120 and amplifiers 122 and 124. These absorption values are used to determine at least one measured spatial profile associated to the article. The measured spatial profiles and determination of these measured spatial profiles are further described below. In an embodiment the measured spatial profile(s) is/are maintained in data store 130.

Data store 132, for example, maintains a spatial profile database of reference spatial profiles representing absorption coefficient data values for desirable and undesirable values for articles, for example healthy onions and rotten onions.

A comparator 134 compares at least one measured spatial profile from data store 130 with reference spatial profiles from spatial profile database 132 in order to assess at least one internal quality attribute for an article for example an onion. In an embodiment this internal quality attribute includes whether the onion is healthy or rotten.

In an embodiment the comparator 134 determines an assessment of at least one article. In an embodiment the comparator 134 determines at least one internal quality of the article 102 at least partly from a comparison of at least one measured spatial profile from the data store 130 with at least one reference spatial profile from the spatial profile database 132.

In an embodiment the comparator 134 determines or receives at least one measured spatial profile associated to the article 102. In an embodiment the measured spatial profile(s) each include a plurality of ratios of respective spectroscopic values associated to the low band laser 104 to respective spectroscopic values associated to the high band laser 110. In an embodiment the measured spatial profile(s) each include a plurality of ratios of respective spectroscopic values associated to the high band laser 106 to respective spectroscopic values associated to the low band laser 104.

In an embodiment at least one of the reference spatial profiles are associated to a class of articles of agricultural produce. For example, at least some of the spatial profiles may be associated to respective degrees of defects in onions, apples and other items of agricultural produce.

An output module 136, for example, presents an output from the comparator 134. In an embodiment the output module 136 presents an assessment of the onion to a user. In an embodiment the output module 136 transmits an assessment of the onion to a processor, for example to remove a rotten onion from a conveyor belt.

In an embodiment, the ratio of first wavelength light to second wavelength light is selected from the following:
700 to 750 nm:780 to 810 nm
850 to 900 nm:780 to 810 nm
700 to 750 nm:850 to 900 nm
850 to 900 nm:780 to 810 nm
700 to 750 nm:850 to 900 nm.

Figure 2:
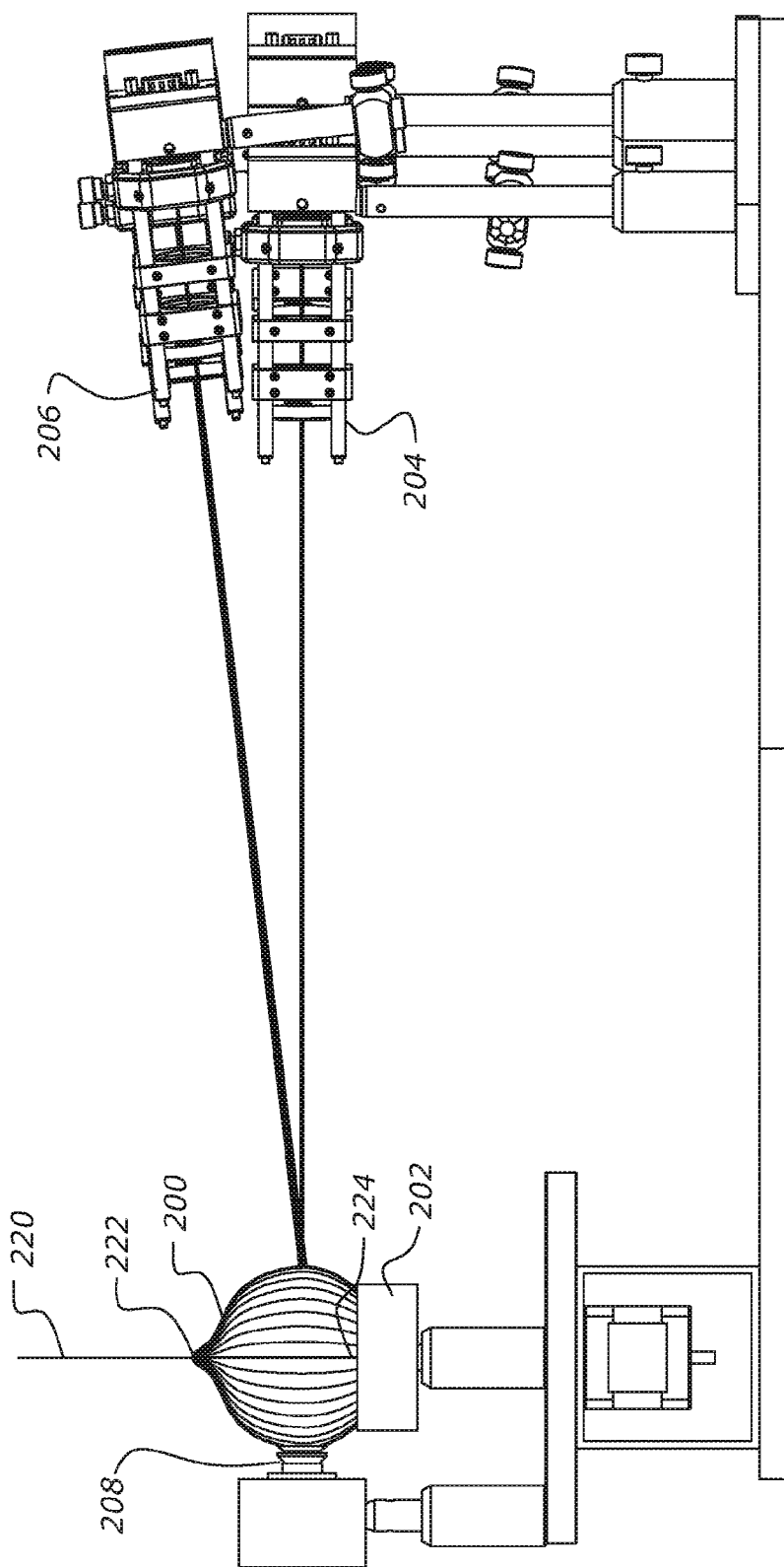
FIG. 2 shows an example of the system of FIG. 1 adapted for use in a quality assurance.

FIG. 2 shows an example of the system 100 of FIG. 1 adapted for use in a quality assurance application. In this example an article of agricultural produce is removed from a batch of similar articles. The selected article is assessed for quality. An assessment of the batch of articles is based at least partly on articles randomly selected from the batch and subjected to quality assessment.

As shown in FIG. 2 an article of agricultural produce, in this case an onion 200, is seated on a cup mount 202. In an embodiment the onion is shown with a stem end seated within the mount 202.

A plurality of lasers direct light toward the onion. FIG. 2 shows lasers 204 and 206 by way of example. A photodiode 208 obtains absorption values representing the extent of absorption of light from lasers 204 and 206 by the onion 200.

In an embodiment the cup mount 202 is adapted to rotate the onion 200 about an axis 220 extending between a first pole 222 and a second pole 224 of the onion 200. As the onion 200 rotates about the axis 220, different points on the surface of the onion 200 are exposed to the lasers 204 and 206. In an embodiment, a point on the surface of the onion 200 is represented by a latitude along the axis 220 and a longitude around a circumference of the onion 200.

In an embodiment the article is at least partly spherical. Apples and onions for example have a generally spherical shape. Points on the surface of a spherical article are therefore associated to respective latitudes and longitudes. In an embodiment, articles that are not spherical are associated to respective latitudes and longitudes.

In this embodiment the photodiode 208 obtains a plurality of absorption values at different orientations of the onion 200 with respect to the lasers 204 and 206. The spectroscopic values associated to laser 204 and/or the spectroscopic values associated to laser 206 represent respective longitudes around the circumference of the onion 200. The values represent respective longitudes to which low band light or high band light is directed from laser 204 or laser 206.

In an embodiment the lasers 204 and 206 are adapted to move relative to the onion so as to obtain spectroscopic values at different latitudes of the onion 200. In an embodiment there are positioned lasers additional to lasers 204 and 206 so as to obtain spectroscopic values at different latitudes of the onion 200. The values represent respective latitudes to which low band light or high band light is directed from laser 204 or laser 206.

Figure 3:
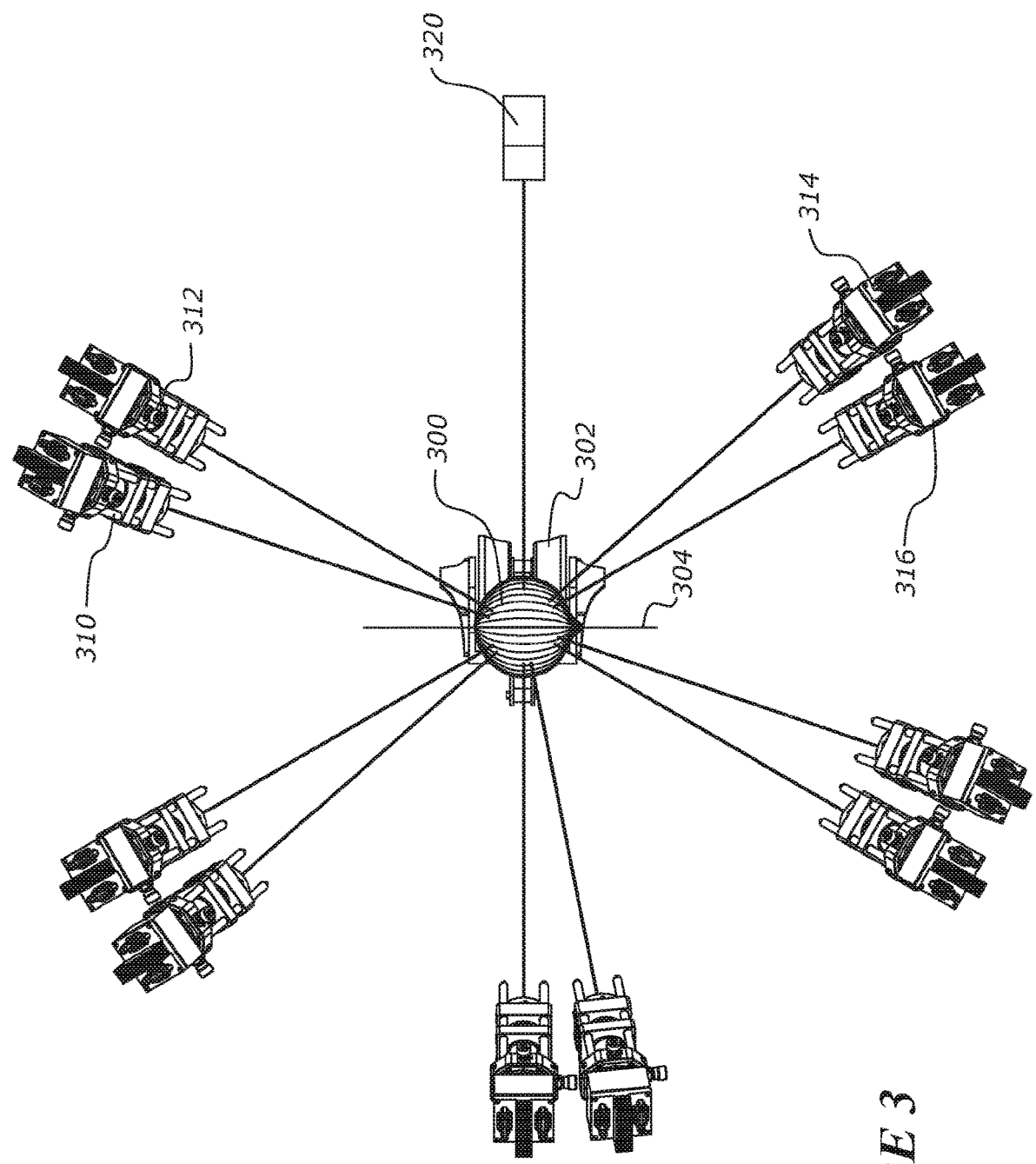
FIG. 3 shows an example of the system of FIG. 1 adapted for use in a high speed grading application.

FIG. 3 shows an example of the system 100 of FIG. 1 adapted for use in a high speed grading application. In this example an article of agricultural produce is assessed while being conveyed in a grading system.

As shown in FIG. 3 an article of agricultural produce, in this case an article 300 such as an onion, is supported on a roller 302 forming part of a high speed grading application.

In an embodiment the onion is rotated about an axis 304 extending through the stem end of the onion while travelling along a conveyor.

A plurality of lasers direct light toward the onion. FIG. 3 shows 10 lasers, which include lasers 310, 312, 314, and 316 for example. It will be appreciated that the number of lasers can be varied. In an embodiment the lasers are grouped into pairs of lasers. The pairs of lasers are positioned so as to direct light toward different parts of the onion at different incident angles. The lasers within each pair of lasers are positioned so as to direct light toward similar parts of the onion at similar incident angles.

In an embodiment the pairs of lasers are configured to direct, toward the onion, light associated to a first wavelength and light associated to a second wavelength. The first wavelength is different to the second wavelength. Within the respective pairs of lasers a first laser is configured to direct light of a first wavelength toward the onion and a second laser is configured to direct light of a second wavelength.

A photodiode 320 is positioned so as to obtain absorption values representing the extent of absorption of light from lasers 310, 312, 314, and 316 directed to different points of the onion 300 representing different longitudes and latitudes. In an embodiment the photodiode is positioned between the roller 302 and the onion 300 and shaped so as to measure light absorption from at least one of the lasers.

In an embodiment laser 310 and laser 314 are configured to direct low band light at least partly through the article 300, while laser 312 and laser 316 are configured to direct high band light at least partly through the article 300.

The spectroscopic values associated to lasers 310, 312, 314 and 316 represent respective longitudes around the circumference of the onion 200. The values represent respective longitudes to which low band light or high band light is directed from the lasers.

In embodiment laser 310 and laser 312 are configured to direct low band light and high band light respectively toward the same latitude of the article 300. Laser 314 and laser 316 are configured to direct low band light and high band light respectively toward the same latitude of the article 300. The latitude associated to laser 310 and 312 is different to the latitude associated to laser 314 and laser 316.

Figure 4:
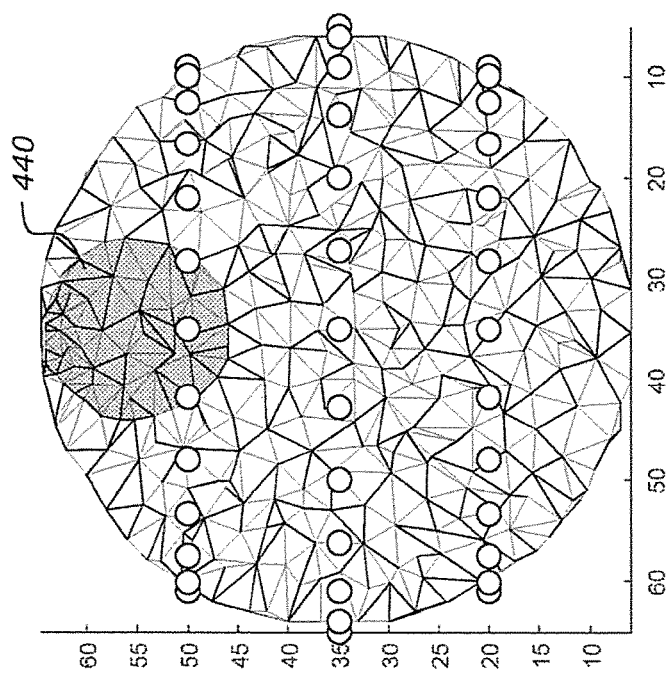
FIG. 4 shows an example of multiple laser and detector positions adapted for use in either a quality assurance application or a high speed grading application.
Figure 4:
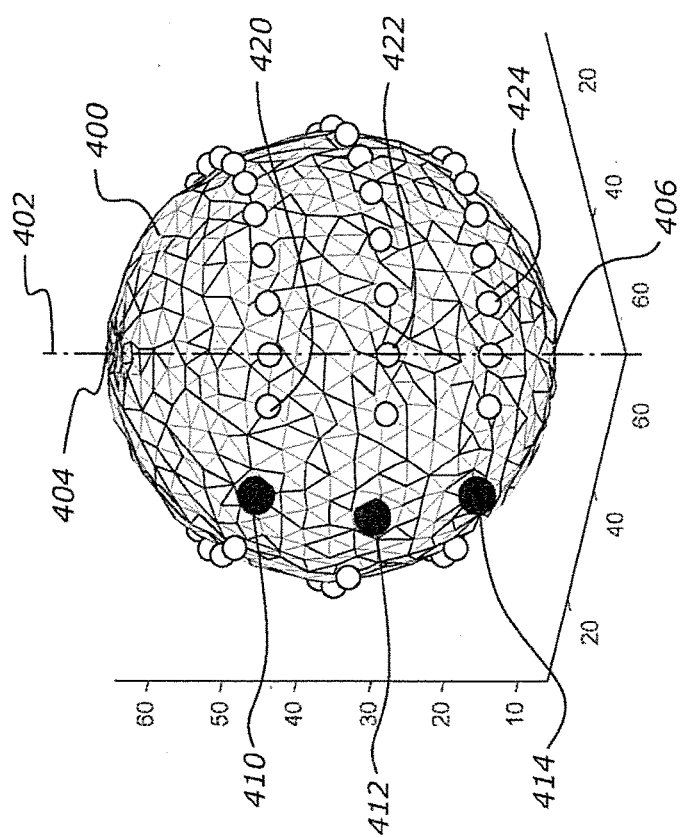

FIG. 4 shows an example of multiple laser and detector positions adapted for use in either a quality assurance application or a high speed grading application.

A representation of an article 400 is shown having an axis 402 extending between a first pole 404 and a second pole 406. The spectroscopic values are obtained from three detectors indicated at 410, 412, and 414 respectively. It will be appreciated that various embodiments include fewer than three or more than three detectors.

In an embodiment the detectors are positioned at different latitudes along the axis 402. In an embodiment a single detector is configured to move along the axis 402 so as to obtain spectroscopic values representing different latitudes along the axis 402.

The representation of the article 400 includes points on the surface of the article having different longitudes around the circumference of the article. Examples of points having different longitudes are indicated at 420, 422 and 424 respectively.

In an embodiment the longitude of the detectors 410, 412, and 414 is assumed to be zero degrees. Point 420 is located at a longitude of 67.5 degrees, point 422 is located at a longitude of 78.75 degrees, and point 424 is located at a longitude of 90 degrees with respect to the detectors. In an embodiment there are 21 points evenly located around the surface of the article from 67.5 degrees to 292.5 degrees with respect to the detectors 410, 412, 414.

There are 21 points shown in FIG. 4 around the circumference of the article that share the same latitude. In an embodiment having a points with three different latitudes and 21 different longitudes there would be a total of 63 different points on the surface of the article to which light from the lasers is directed. It will be appreciated that the number of latitudes of the points can be less than three or more than three. It will also be appreciated that the number of longitudes of the points can be less than or more than 21.

Also shown in FIG. 4 is a spherical region 440 representing rotten tissue within the article 400. It will be apparent that the presence of the spherical region 440 would be detected by examining the spectroscopic values obtained from detector 410. However, examination of the spectroscopic values obtained from detector 412 or detector 414 would not detect the presence of the spherical region 440.

Figure 5:
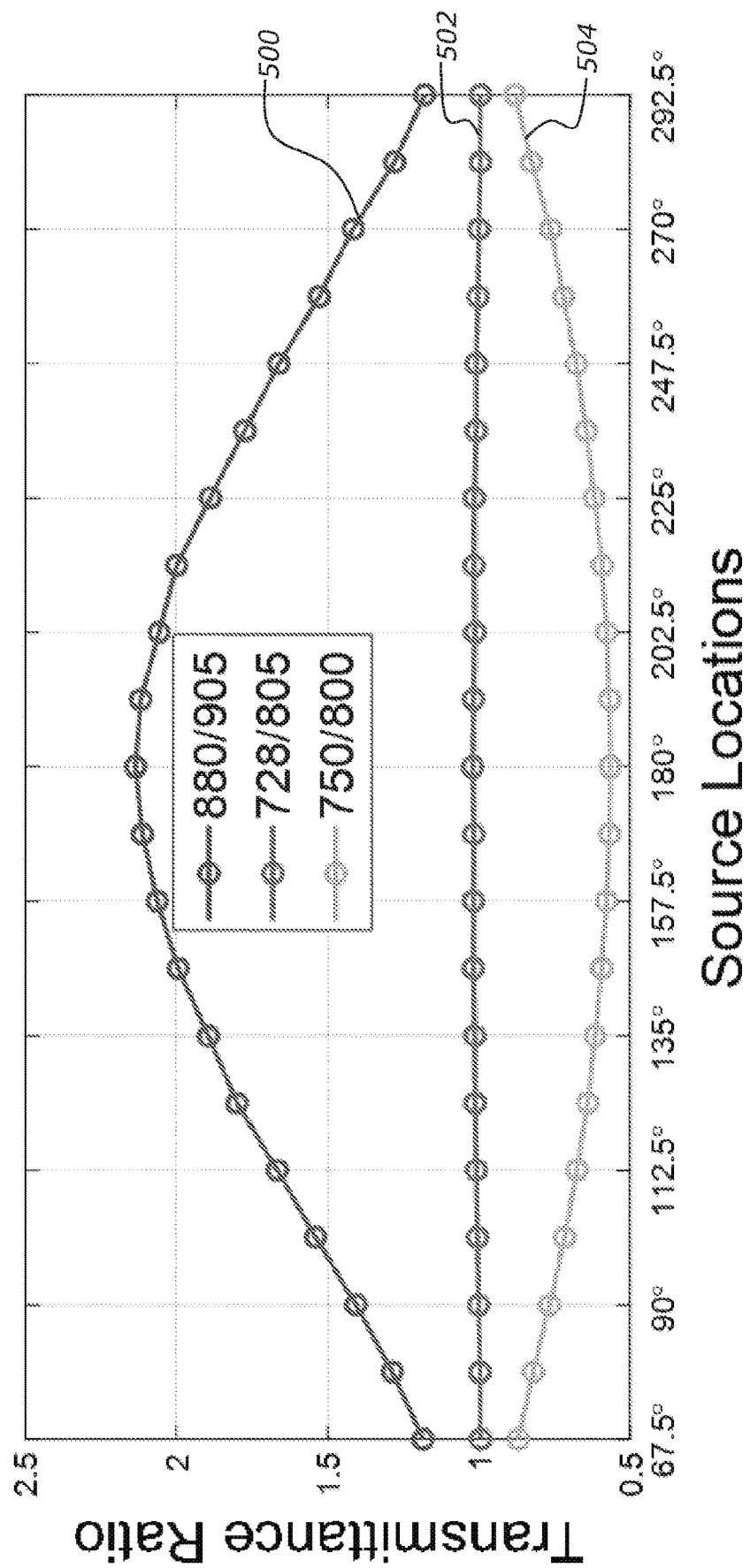
FIG. 5 shows an example of spectroscopic values obtained from a healthy onion.

FIG. 5 shows an example of spectroscopic values obtained from a healthy onion using light transport simulation software. Transmittance ratios at various longitudes (source locations) around the surface of the article are shown for different wavelengths of low band and high band light. Examples of wavelengths include 880 nm:905 nm at 500, 728 nm:805 nm at 502, and 750 nm:800 nm at 504. Transmittance ratios are shown on the y axis of the graph. Various longitudes around the circumference of the article are shown on the x axis of the graph.

It has been found that a ratio of light transmittance at two different wavelengths can be used to identify rots. However, this ratio is dependent on source-detector separation.

This effect can be explained by the diffusion approximation of the radiative transfer equation used to calculate the light transport in diffusive medium. The fluence (light energy per unit area), $\phi$, is calculated as:

$$\Phi(r) = \frac{3\mu'_s}{4\pi r} e^{-\mu_{eff} r} \quad (1)$$

where $$\mu_{eff} = \sqrt{3\mu_a \mu'_s} \quad (2)$$

is the attenuation coefficient, r is the source-detector separation distance, $\mu_a$ and $\mu_s'$ are the absorption and reduced scattering coefficients, respectively.

For two wavelengths, $\lambda_1$ and $\lambda_2$, the corresponding fluences are $\Phi_1$ and $\Phi_2$. Using equation (1) the ratio can be expressed as:

$$\frac{\Phi_1}{\Phi_2} = \frac{\mu'_{s_1}}{\mu'_{s_2}} e^{(\mu_{eff_2} - \mu_{eff_1})r} \quad (3)$$

This ratio is not only dependent on the optical properties at these two wavelengths but also on the separation distance, r.

As shown in FIG. 5, the measured transmittance ratio values shown at 500 increase with increased source-detector distance to a maximum at 180 degrees. The measured transmittance ratio values shown at 504 decrease to a minimum at 180 degrees.

Therefore a change in transmittance ratio depends on the source-detector distance as well as the level of rot.

Measuring the source-detector separation distance is a possible solution but is not practical for online applications. According to equation 3, the transmittance ratio changes depending on the difference of $\mu_{eff}$ at the two wavelengths.

If the two attenuation coefficients are equal, $\mu_{eff_1} = \mu_{eff_2}$, the ratio becomes:

$$\frac{\Phi_1}{\Phi_2} = \frac{\mu'_{s_1}}{\mu'_{s_2}} \quad (4)$$

This is now a ratio of the reduced scattering coefficients, independent of the source-detector separation distance. The 728 nm and 805 nm wavelength ratio shown at 502 has been found to have good classification performance. Furthermore, the attenuation coefficients are similar at these wavelengths, resulting in a transmittance ratio that is almost constant with distance.

Compared to healthy tissue, rotten tissue has higher absorption and lower scattering coefficients from 710 to 950 nm, resulting in different $\mu_{eff}$. Therefore, the target ideal of $\mu_{eff_1} = \mu_{eff_2}$, for separation distance independence, will likely not hold if there is rotten tissue intersecting the light path.

The presence of rotten tissue will more likely cause a peak or trough on the scanned spatial profile. It is anticipated that such pattern differences in the spatial profiles could be the basis of a detection method, possibly with higher sensitivity because the method would be using additional spatial information with the ratio.

Figure 6:
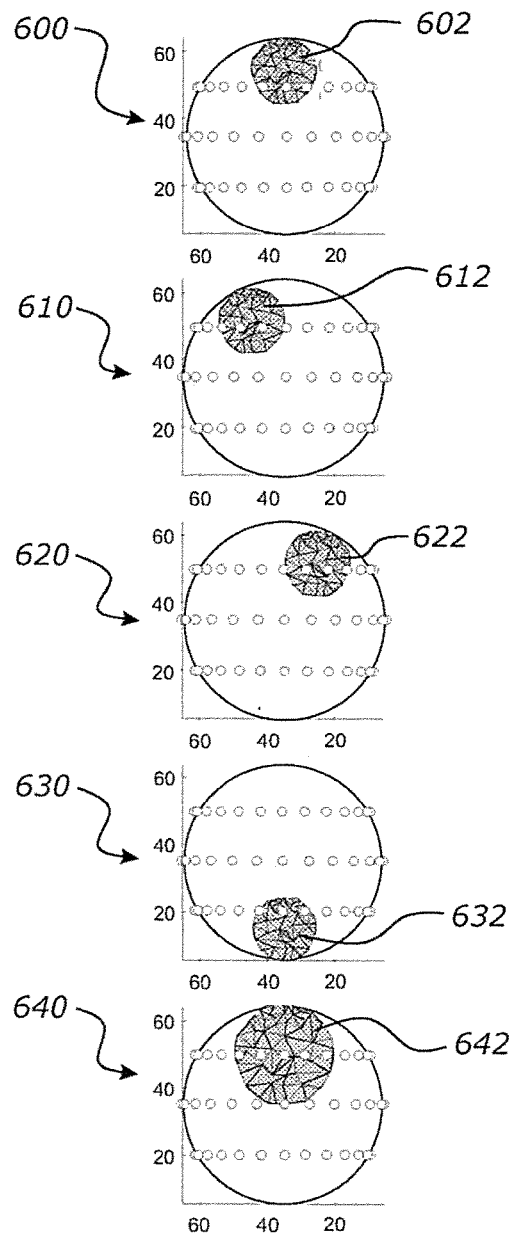
FIG. 6 shows the effect on the transmittance ratio profile for rots at different positions around an article.
Figure 6:
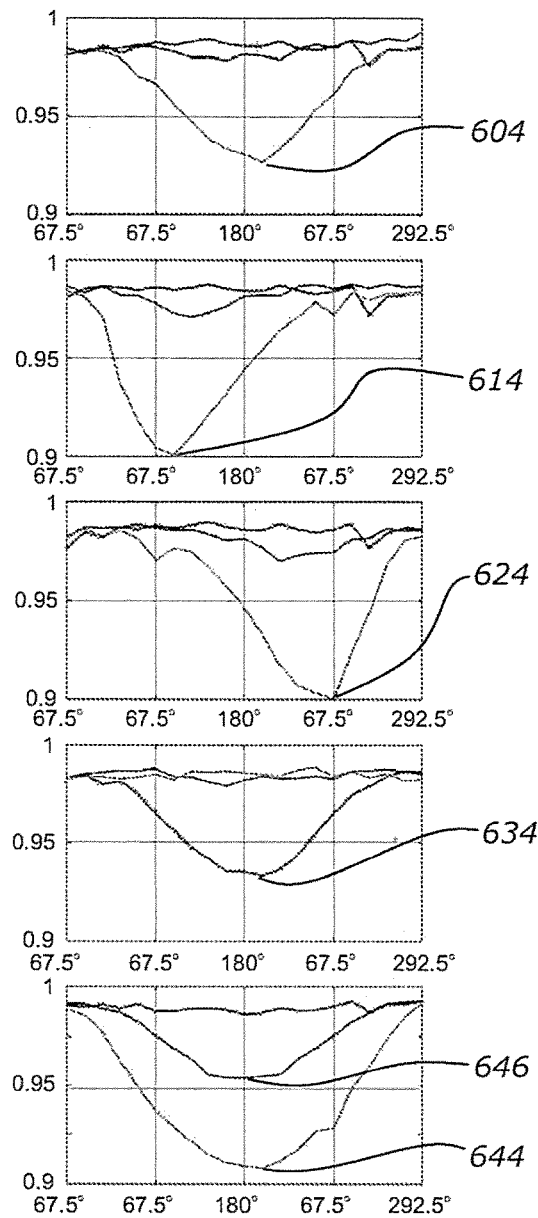

FIG. 6 shows the effect on the transmittance ratio profile for rots of different sizes and at different positions around an article using light transport simulation software.

Shown at 600, 610 and 620 respectively are three different positions 602, 612, and 622 for the location of rot within an article. In each case the position of the rot is located near a stem end at a top latitude along an axis through the article, and horizontally moved to three different positions.

In each case, the rot produced a distinctive trough in the profile of the top latitude. The respective troughs are indicated at 604, 614 and 624 respectively. The trough positions 604, 614 and 624 correspond to the respective positions of the rot.

Shown at 630 is a position 632 of rot located close to the basal plate of the onion. The resulting spatial profile displays a trough 634 at the centre.

Shown at 640 is a bigger rot at a position 642 at a top latitude, causing a wider trough 644 in the top profile and a shallower trough 646 in the middle profile.

The results shown in FIG. 6 indicate that the ratio profiles at three different latitudes is sufficient to indicate the position and size of rot in an article. It will be appreciated that more than three latitudes can be used.

Figure 7:
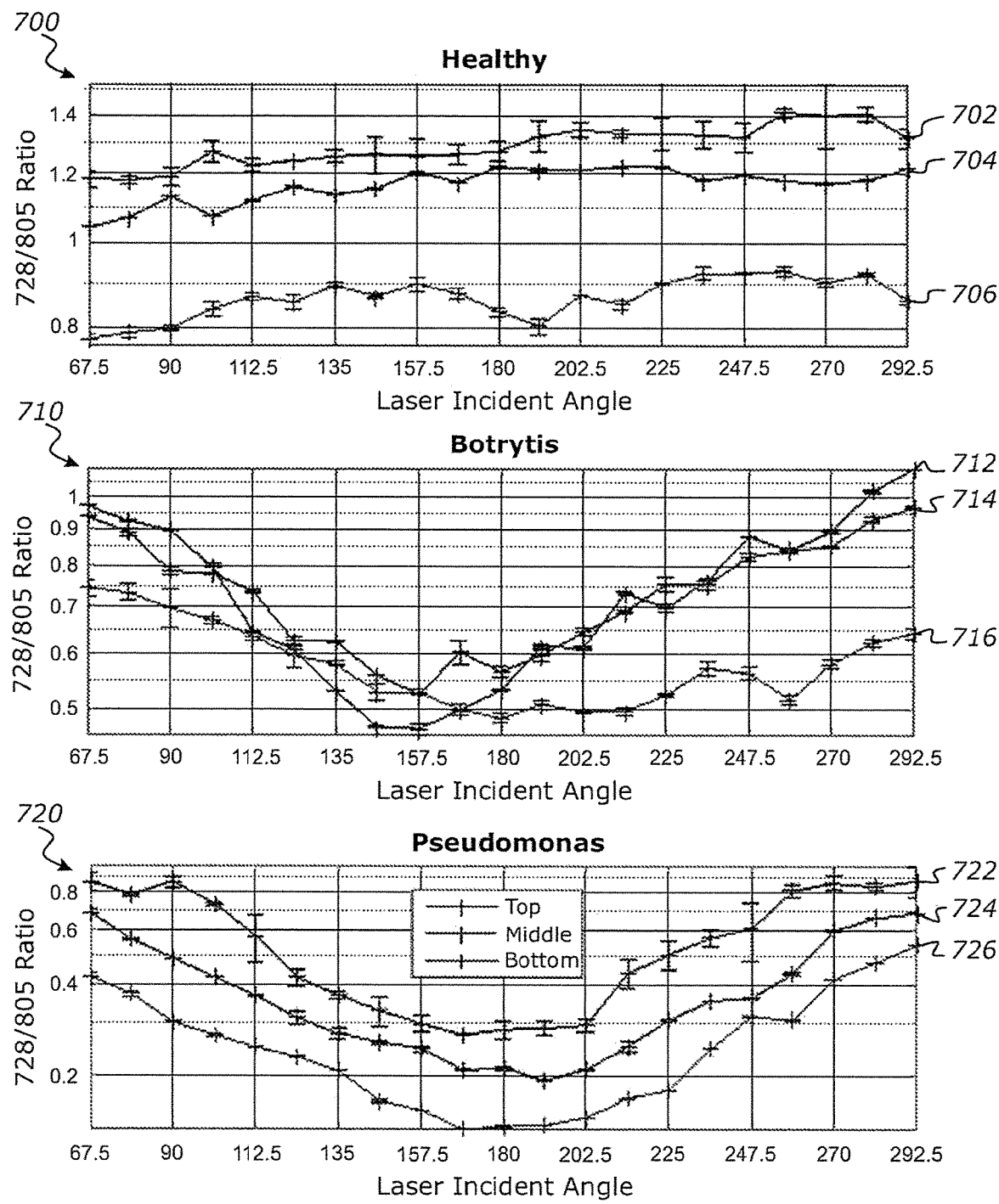
FIG. 7 shows an example of an assessment of internal quality attributes of three different onions.

FIG. 7 shows an example of an assessment of internal quality attributes of three different onions. Light of a first wavelength of 728 nm and light of a second wavelength of 805 nm is directed toward the onions at a range of laser incident angles. For each of onions 700, 710 and 720, three measured spatial profiles are determined. It will be appreciated that in an embodiment the number of different measured spatial profiles determined includes at least three different measured spatial profiles.

Shown at 700 is a range of absorption values for a healthy onion. The values are shown as three different measured spatial profiles 702, 704 and 706 each comprising ratios of the absorption values from the first wavelength to the absorption values from the second wavelength.

The ratios in spatial profile 702 for example share a common lower latitude value. The ratios in spatial profile 704 share a common middle or intermediate latitude value. The ratios in spatial profile 706 share a common upper latitude value. In an embodiment the latitudes associated to each of spatial profiles 702, 704 and 706 are different to each other.

Each of the spatial profiles is shown associated to a spatial range of different laser incident angles, or longitudes around the article. The range is shown in FIG. 4 as 67.5° to 292.5°. It will be appreciated that this range can be varied. In an embodiment the spatial profiles 702, 704 and/or 706 include at least a first ratio and a second ratio, the longitude associated to the first ratio not equal to the longitude associated to the second ratio. In an embodiment the spatial profiles 702, 704 and/or 706 include at least 3 ratios associated to a plurality of respective different longitudes.

Shown at 710 is a range of absorption ratio values for an onion infected with *Botrytis*.

The ratios of absorption values for each of the lower latitude 712, middle latitude 714 and upper latitude 716 show a wide 'v' shape profile with a nadir at approximately 180°.

It is to be expected that the central portion of the onions in this group have more rotten tissue being traversed by the light. Therefore the absorption values are lower. The drop in the ratio is indicative of a location of the rot within the onions, in this case localised to the centres of the onions.

Shown at 720 is a range of absorption ratio values for an onion infected with *Pseudomonas*. The ratios of absorption values for each of the lower latitude 722, middle latitude 724 and upper latitude 726 show a wide 'v' shape profile with a nadir at approximately 180°. The spatial profiles 720 when plotted show a similar pattern to the spatial profiles 710.

The spatial profiles 702, 704, 706 of the healthy onion show a relatively flat ratio response across the spatial range of incident angles. The spatial profiles 712, 714, 716, 722, 724, and 726 on the other hand show a distinctive 'v' shape. Spatial profiles 700 show a response ratio with a relatively small standard deviation. Spatial profiles 710 and 720 show a response ratio with a larger standard deviation than spatial profiles 700.

In an embodiment the comparator 134 from FIG. 1 compares the standard deviation of at least one ratio of respective first spectroscopic values to second spectroscopic values with the spatial profiles shown in FIG. 7. The standard deviation of the ratios of absorption values are compared to the standard deviations of the stored spatial profiles. Based at least partly on this comparison of standard deviations, the onion under evaluation is assessed as being either healthy or rotten.

Figure 8:
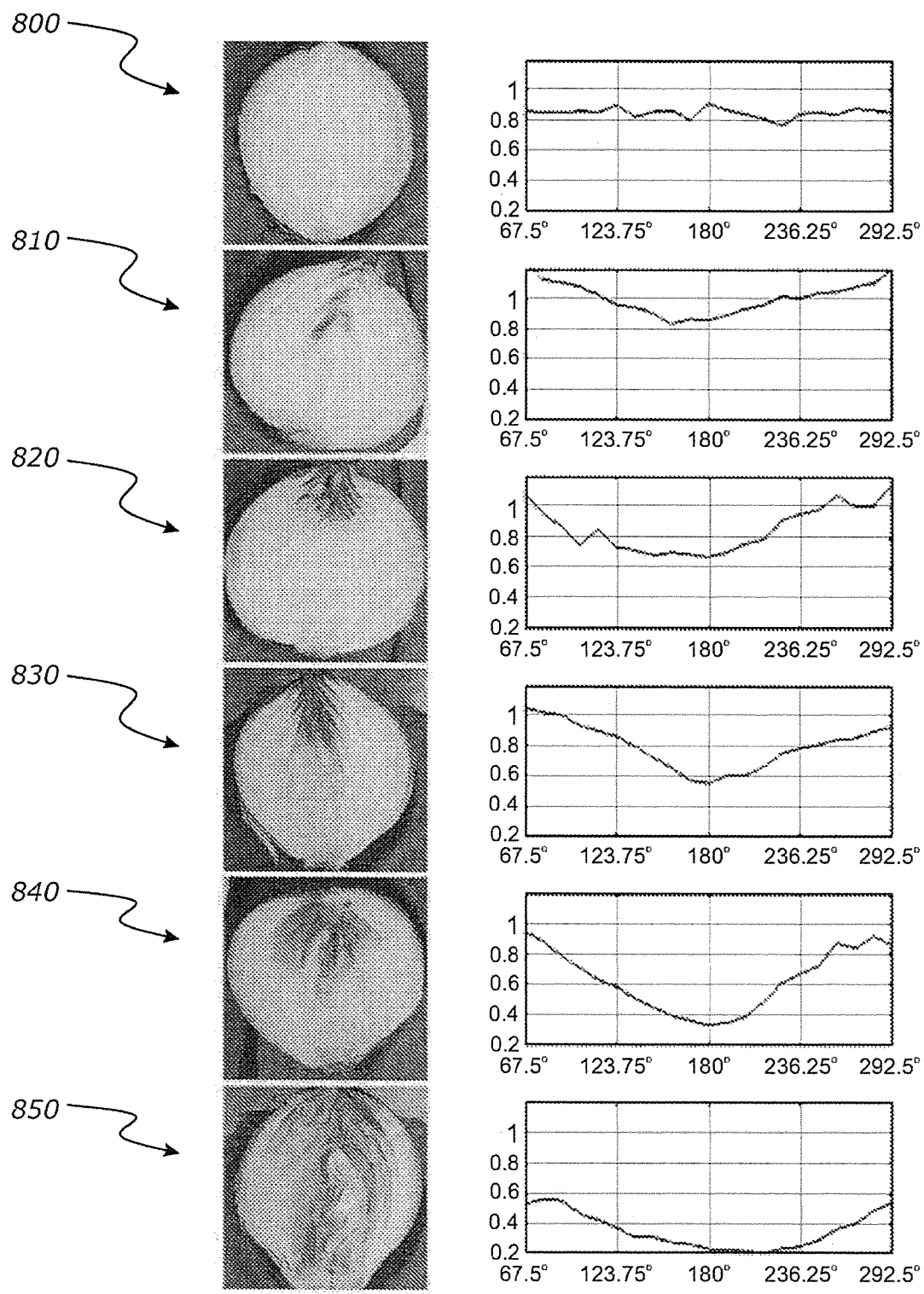
FIG. 8 shows examples of measured spatial profiles.

FIG. 8 shows examples of measured spatial profiles. A healthy onion 800 shows a largely flat line with some minor fluctuations, possibly caused by the variegated light absorbing character of the onion skin.

Rotten onions 800, 810, 820, 830, 840, and 850 showed a trough on the spatial profile. Both *pseudomonas* and *botrytis* caused the rot to develop first in the top middle core of the onion, so the troughs appeared in the centre of the profiles.

It was found that the larger the rot, the deeper the trough. The clear presence of the trough for onion 810 indicates that the system is sensitive to a very small rot.

The onion 850 had rotten tissue occupying almost the entire volume at the neck end. The profile level in that case was dramatically reduced compared to the other profiles but there was still a clear trough in the middle of the profile.

Hence the profile level in addition to profile pattern has the potential to be useful in the discrimination of severity of rot.

Figure 9:
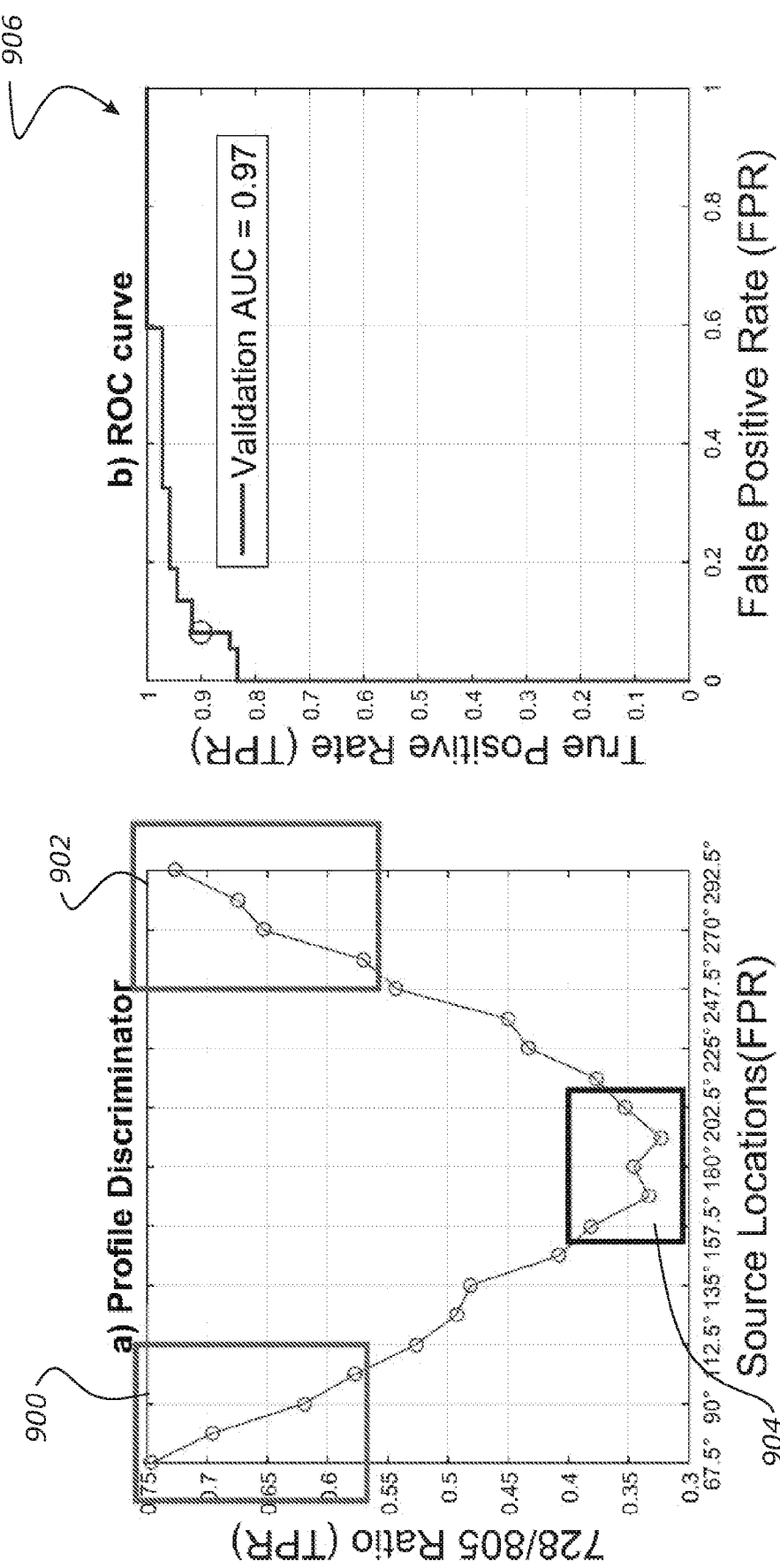
FIG. 9 shows an example of a technique used by the comparator from FIG. 1 to compare measured spatial profiles from the data store with reference spatial profiles from the spatial profile database.

FIG. 9 shows an example of a technique used by the comparator 134 from FIG. 1 to compare measured spatial profiles from the data store 130 with reference spatial profiles from the spatial profile database 132.

In an embodiment a single signature or discriminator value is used as a metric for comparison. In an embodiment a signature value associated to a measured spatial profile is compared with a reference value associated to a reference spatial profile. An internal quality attribute is determined at least partly from a comparison of a signature value and a reference value.

An example of a signature value is set out below:

$$\text{Signature value} = \frac{(meanSidePoints - meanCentrePoints)}{meanProfile}$$

In an embodiment the signature value is determined from a subset of the ratios of a measured spatial profile. For example, the variable meanSidePoints is the average of the first four points shown at 900 and the last four points shown at 902. The variable meanCentrePoints is the average of the five points in the centre shown at 904. The variable meanProfile is the average of all the points. In an embodiment A deeper trough on a profile will be associated with a higher discriminator value, therefore a threshold can be set to segregate the onions. Indicated at 906 are the ROC curves for the above comparison technique. The technique is found to provide higher AUC values and better performance than previous techniques.

Figure 10:
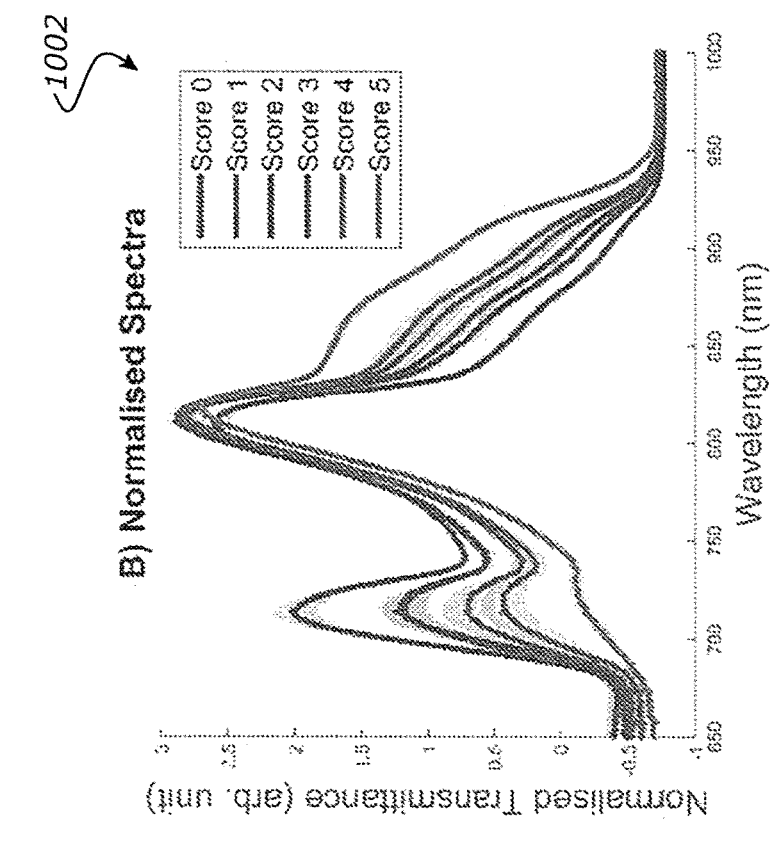
FIG. 10 shows examples of raw spectra and normalised spectra recorded on healthy and rotten onions.
Figure 10:
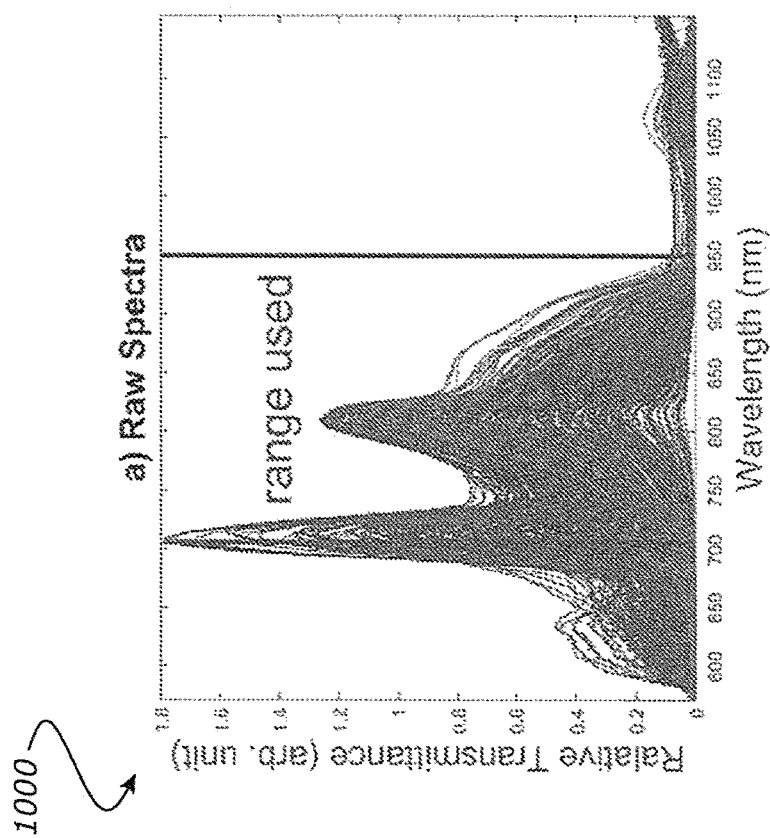

FIG. 10 shows examples of raw spectra 1000 and normalised spectra 1002 recorded on healthy and rotten onions. Within the range 680-1000 nm, the spectra have good signal to noise ratio due to the lower absorbance from water and pigments.

Normalisation cannot fully eliminate path length variations and could mask some spectral characteristics, but the general spectral features should be preserved. The average SNV normalised spectra for each severity score are shown at 1002, with the score 5 spectra being appreciably different.

Rotten onions were found to have lower transmittance in the wavelength range 680 to 750 nm and higher transmittance in the 800 to 950 nm range. Wavelengths chosen from these two ranges have the potential to be useful for detecting the presence of rotten tissue.

The middle region, from 770 to 810 nm, might then be used as a reference with which to normalise light intensity variations and/or spectral drift as the spectra are all closer to each other in that region as shown at 1000, even overlapping in the normalised view as shown at 1002. A transmittance ratio at two wavelengths has the potential to be an effective classification methodology.

Figure 11:
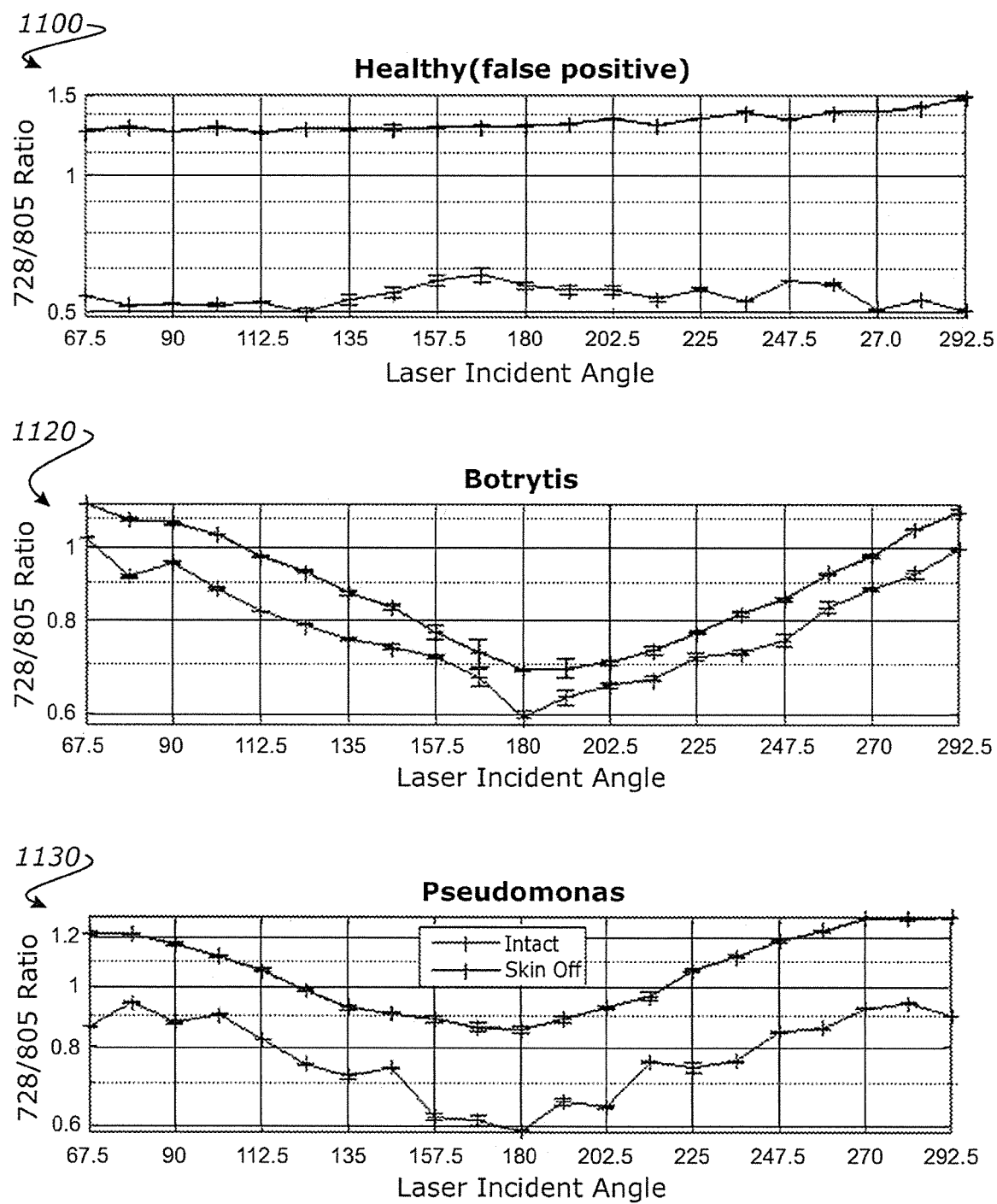
FIG. 11 shows results of another set of measurements using three different onions.

FIG. 11 shows results of another set of measurements using three different onions, for example a healthy onion 1100, an onion infected with *botrytis* 1120, and an onion infected with *pseudomonas* 1130.

A healthy onion known to have given a false positive result using a 728/805 ratio classification method was used. The onions were measured on the middle position, and then measurements were repeated after carefully peeling away 2 to 3 dry skin layers.

The ratio profile was consistent with either the skin on or off for each of the onions and the healthy onion was detected correctly in both cases. Therefore the multi-laser system appeared to be successful in removing the skin interference problem.

A further experiment with apples showed that intensity ratios at 699/805 and 728/805 were useful for detecting vascular browning defects in apples. An experimental trial comprised 50 healthy and 50 defective Braeburn apples.

For clarity of results, a small number of results were selected for illustrative discussion. In this example the results were from 3 healthy and 4 defective apples.

Figure 12:
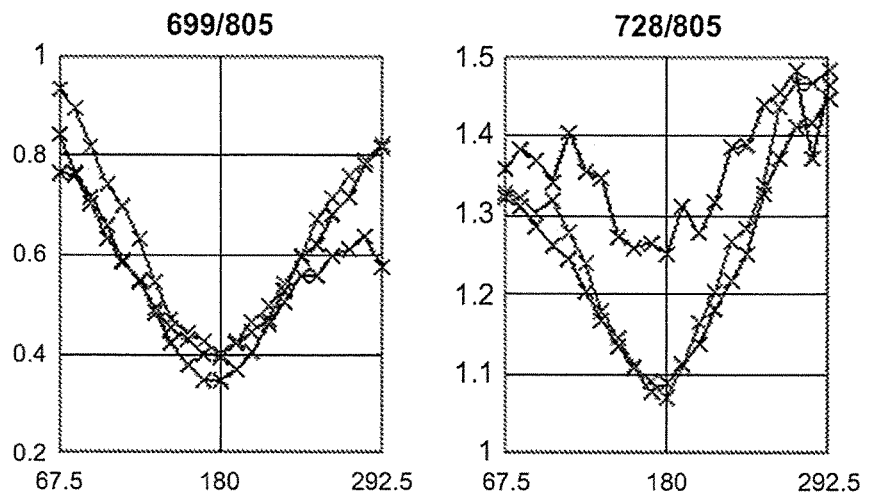
FIG. 12 shows a spatial profile for healthy apples.

FIG. 12 shows that the apple core of a healthy apple, which contains open seed cavities, produced a distinctive trough in the spatial profile for the intensity ratios. The trough was centred at 180° and was much deeper and smoother with the 699/804 ratio.

Figure 13:
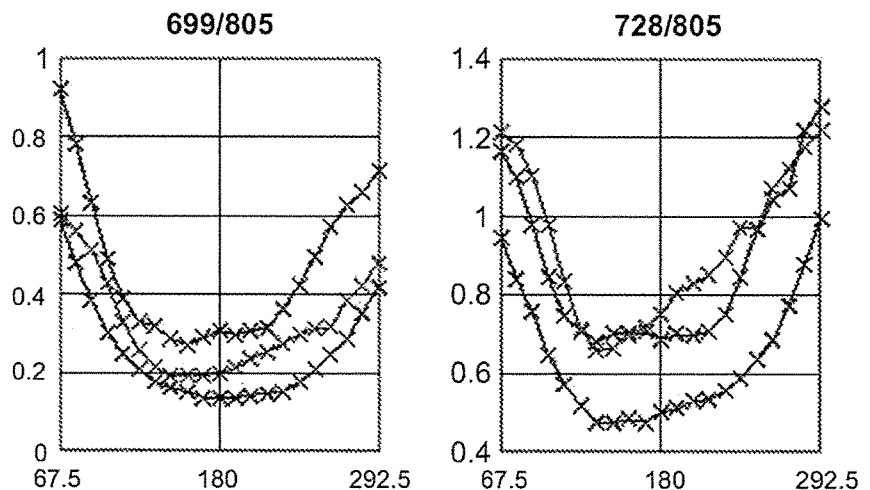
FIG. 13 shows a spatial profile for defective apples.

FIG. 13 shows an example using defective apples. The vascular browning defects in the apples were generally scattered around the core. This effectively broadened the trough in the spatial profiles.

Figure 14:
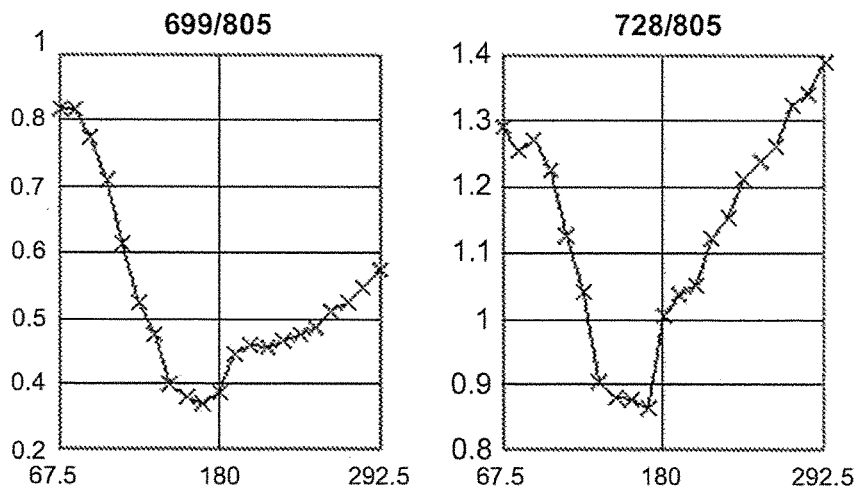
FIG. 14 shows asymmetry in the spatial profile of defective apples.

FIG. 14 shows that asymmetry in the spatial profile was observed when the defect was small and localised to one side of the core.

Figure 15:
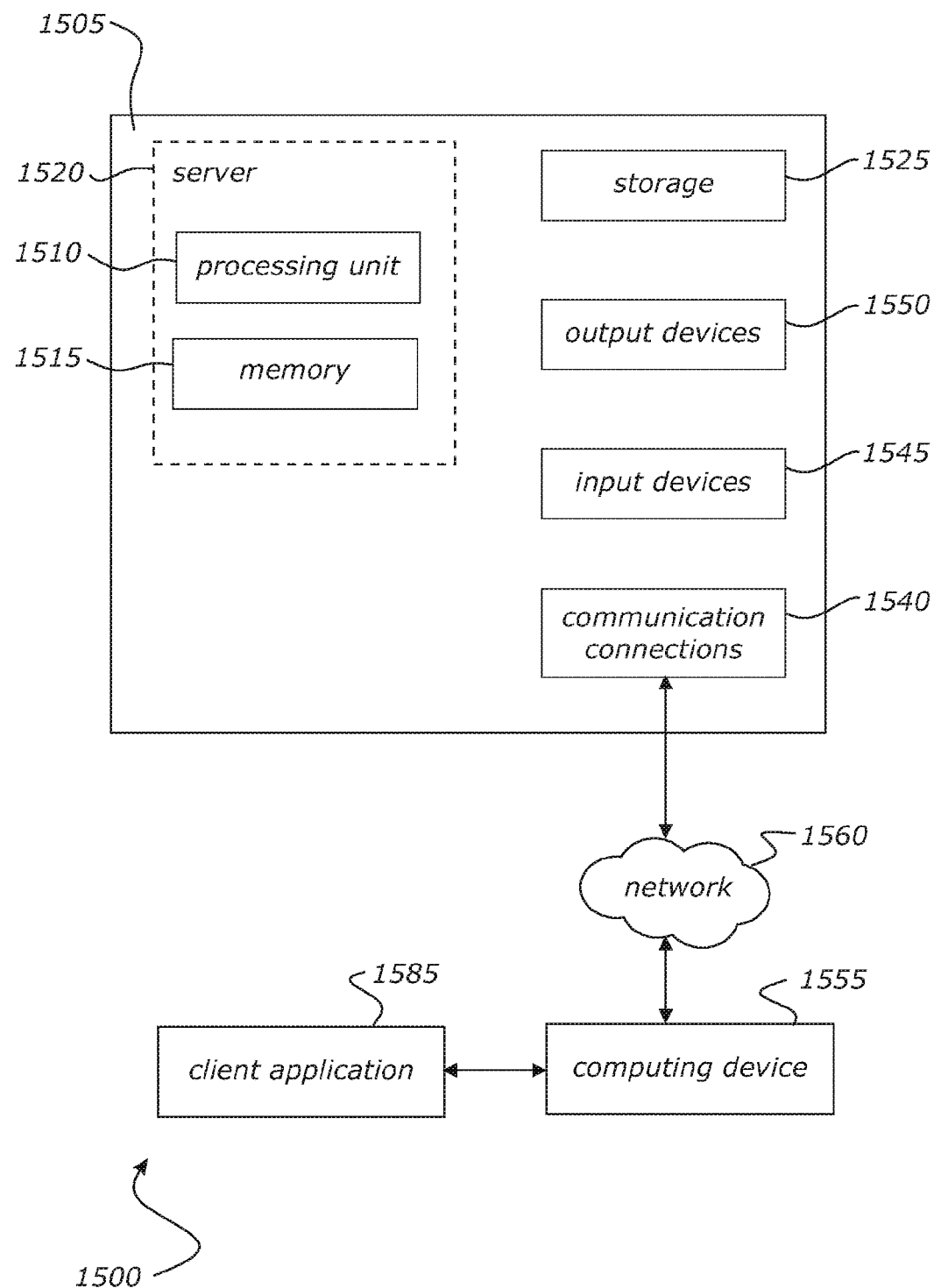
FIG. 15 shows an embodiment of a suitable computing environment to implement embodiments of one or more of the systems and methods disclosed above.

FIG. 15 shows an embodiment of a suitable computing environment to implement embodiments of one or more of the systems and methods disclosed above. The computing environment for example may implement one or more of the components of FIG. 1. These components include the data store 130, the spatial profile database 132, the comparator 134, and the output module 136.

The operating environment of FIG. 15 is an example of a suitable operating environment. It is not intended to suggest any limitation as to the scope of use or functionality of the operating environment. Example computing devices include, but are not limited to, personal computers, server computers, hand-held or laptop devices, mobile devices, multiprocessor systems, consumer electronics, mini computers, mainframe computers, and distributed computing environments that include any of the above systems or devices. Examples of mobile devices include mobile phones, tablets, and Personal Digital Assistants (PDAs).

Although not required, embodiments are described in the general context of 'computer readable instructions' being executed by one or more computing devices. In an embodiment, computer readable instructions are distributed via tangible computer readable media.

In an embodiment, computer readable instructions are implemented as program modules. Examples of program modules include functions, objects, Application Programming Interfaces (APIs), and data structures that perform particular tasks or implement particular abstract data types. Typically, the functionality of the computer readable instructions is combined or distributed as desired in various environments.

Shown in FIG. 15 is a system 1500 comprising a computing device 1505 configured to implement one or more embodiments described above. In an embodiment, computing device 1505 includes at least one processing unit 1510 and memory 1515. Depending on the exact configuration and type of computing device, memory 1515 is volatile (such as RAM, for example), non-volatile (such as ROM, flash memory, etc., for example) or some combination of the two.

A server 1520 is shown by a dashed line notionally grouping processing unit 1510 and memory 1515 together.

In an embodiment, computing device 1505 includes additional features and/or functionality. One example is removable and/or non-removable additional storage including, but not limited to, magnetic storage and optical storage. Such additional storage is illustrated in FIG. 15 as storage 1525. In an embodiment, computer readable instructions to implement one or more embodiments provided herein are maintained in storage 1525. In an embodiment, storage 1525 stores other computer readable instructions to implement an operating system and/or an application program. Computer readable instructions are loaded into memory 1515 for execution by processing unit 1510, for example.

Memory 1515 and storage 1525 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by computing device 805. Any such computer storage media may be part of device 1505.

In an embodiment, computing device 1505 includes at least one communication connection 1540 that allows device 1505 to communicate with other devices. The at least one communication connection 1540 includes one or more of a modem, a Network Interface Card (NIC), an integrated network interface, a radio frequency transmitter/receiver, an infrared port, a USB connection, or other interfaces for connecting computing device 1505 to other computing devices. In an embodiment, communication connection(s) 1540 facilitate a wired connection, a wireless connection, or a combination of wired and wireless connections. Communication connection(s) 1540 transmit and/or receive communication media.

Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

In an embodiment, device 1505 includes at least one input device 1545 such as keyboard, mouse, pen, voice input device, touch input device, infrared cameras, video input devices, and/or any other input device.

Device 1505 also includes at least one output device 1550 such as one or more displays, speakers, printers, and/or any other output device. In an embodiment the output module 126 from FIG. 1 is implemented at least partially on the output device 1550.

Input device(s) 1545 and output device(s) 1550 are connected to device 1505 via a wired connection, wireless connection, or any combination thereof. In an embodiment, an input device or an output device from another computing device is/are used as input device(s) 1545 or output device(s) 1550 for computing device 1505.

In an embodiment, components of computing device 1505 are connected by various interconnects, such as a bus. Such interconnects include one or more of a Peripheral Component Interconnect (PCI), such as PCI Express, a Universal Serial Bus (USB), firewire (IEEE 13104), and an optical bus structure. In an embodiment, components of computing device 1505 are interconnected by a network. For example, memory 1515 in an embodiment comprises multiple physical memory units located in different physical locations interconnected by a network.

It will be appreciated that storage devices used to store computer readable instructions may be distributed across a network. For example, in an embodiment, a computing device 1555 accessible via a network 1560 stores computer readable instructions to implement one or more embodiments provided herein. Computing device 1505 accesses computing device 1555 in an embodiment and downloads a part or all of the computer readable instructions for execution. Alternatively, computing device 1505 downloads portions of the computer readable instructions, as needed. In an embodiment, some instructions are executed at computing device 1505 and some at computing device 1555.

A client application 1585 enables a user experience and user interface. In an embodiment, the client application 1585 is provided as a thin client application configured to run within a web browser. The client application 1585 is shown in FIG. 15 associated to computing device 1555. It will be appreciated that application 1585 in an embodiment is associated to computing device 1505 or another computing device.

The foregoing description of the invention includes preferred forms thereof. Modifications may be made thereto without departing from the scope of the invention.

The invention claimed is:

1. A method for determining at least one internal quality attribute of an article of agricultural produce, comprising:
    receiving a plurality of first spectroscopic values obtained from directing low band light in a first wavelength associated to a low band of wavelengths from at least one low band light source at least partly through the article toward at least one detector, wherein the low band of wavelengths is in the range 699 nm to 900 nm;
    receiving a plurality of second spectroscopic values obtained from directing high band light in a second wavelength associated to a high band of wavelengths from at least one high band light source at least partly through the article toward the at least one detector, wherein the high band of wavelengths is in the range 729 nm to 900 nm, further wherein the length of the first wavelength associated to the low band of wavelengths is less than the length of the second wavelength associated to the high band of wavelengths, further wherein attenuation coefficients at the first wavelength and the second wavelength are similar;
    determining at least one measured spatial profile associated to the article, the at least one measured spatial profile comprising a plurality of ratios of respective first spectroscopic values to respective second spectroscopic values and/or a plurality of ratios of respective second spectroscopic values to respective first spectroscopic values; and
    determining the at least one internal quality attribute at least partly from a comparison of the at least one measured spatial profile with at least one reference spatial profile associated to a class of articles of agricultural produce.

2. The method of claim 1 wherein:
    the article has an axis between a first pole and a second pole, a plurality of latitudes along the axis, and a plurality of longitudes around a circumference of the article;
    the first spectroscopic values are associated to respective longitudes representing respective longitudes of the article to which low band light is directed from the at least one low band light source; and
    the second spectroscopic values are associated to respective longitudes representing respective longitudes of the article to which high band light is directed from the at least one high band light source.

3. The method of claim 2 wherein the at least one measured spatial profile includes a first measured spatial profile, the first measured spatial profile including at least a first ratio and a second ratio, a first longitude associated to the first ratio not equal to a second longitude associated to the second ratio.

4. The method of claim 3 wherein the at least one measured spatial profile includes a plurality of at least 3 ratios each associated to different longitudes.

5. The method of claim 3 wherein:
    the first spectroscopic values are associated to respective latitudes representing respective latitudes along the axis of the article to which low band light is directed from the at least one low band light source; and
    the second spectroscopic values are associated to respective latitudes representing respective latitudes of the article to which high band light is directed from the at least one high band light source.

6. The method of claim 5 wherein a latitude associated to the first ratio is equal to a latitude associated to the second ratio.

7. The method of claim 5 wherein the at least one measured spatial profile includes a second measured spatial profile, the second measured spatial profile including at least a first ratio and a second ratio each associated to the same latitude not equal to the latitude associated to the first ratio and the second ratio of the first measured spatial profile.

8. The method of claim 5 wherein the at least one measured spatial profile includes a plurality of at least 3 measured spatial profiles, the measured profiles each associated to different latitudes.

9. The method of claim 1 wherein the article is at least partly spherical.

* * * * *